Nov. 3, 1936.    F. O. FERNSTRUM    2,059,220
MOUNTING FOR MARINE ENGINES
Filed Jan. 23, 1935
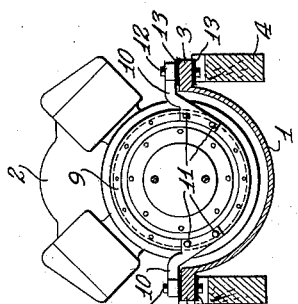
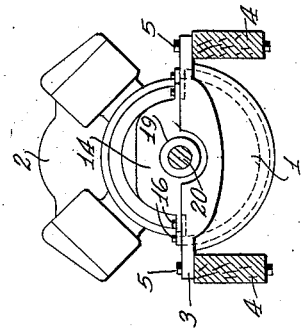
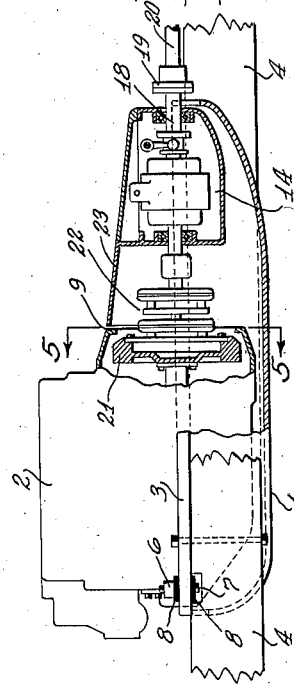
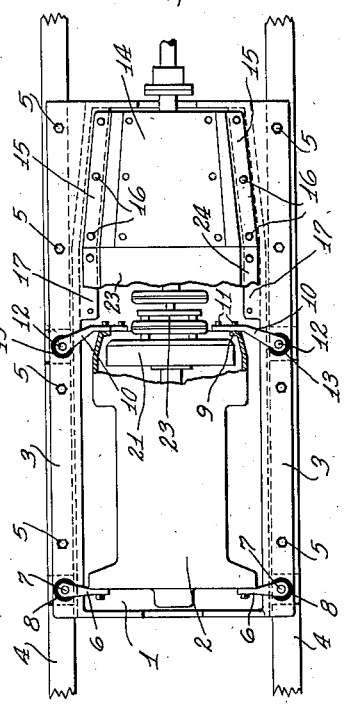
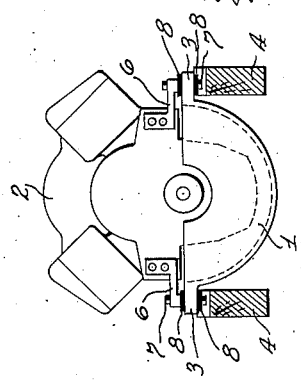
INVENTOR.
Frank O. Fernstrum,
BY
ATTORNEYS Patented Nov. 3, 1936

2,059,220

UNITED STATES PATENT OFFICE 2,059,220

MOUNTING FOR MARINE ENGINES

Frank O. Fernstrum, Detroit, Mich., assignor to Gray Marine Motor Co., Detroit, Mich., a corporation of Michigan Application January 23, 1935, Serial No. 3,040

4 Claims. (Cl. 115—0.5)

The present invention pertains to a novel power bed for supporting an engine in a motor boat.

A primary object of the invention is to provide means for mounting an engine in a boat, the means being especially designed with economy in view, both as to the initial cost of installation, operation and the cost of servicing, repairing or replacing an engine or reversing mechanism after it has already been installed. Although the above mentioned considerations are of paramount importance, the mounting of an engine in a boat presents numerous other problems. For example, the fire hazard introduced by use of a combustion engine is also an important consideration due to the fact that the bilge of a boat ordinarily contains a quantity of water, and fuel or oil spilled into the bilge of the boat is floated over a wide inside area of the boat by this water. The problems relating to servicing of the engine and the fire hazard are overcome in the invention by provision of a power bed which is permanently secured to the keelsons in the bilge of the boat for receiving and supporting an engine and a reverse gear drive, the engine and reverse gear being separately supported by the bed so that, in the event of engine trouble, or trouble with the reverse gear, the engine or the reverse gear may be quickly removed and replaced by another engine or reverse gear without making it necessary for the boat to remain idle while the engine is undergoing repairs or is being reconditioned. This feature is advantageous, for example, in connection with fleets of commercial, fishing or ferry boats, it being undesirable that a boat should have to remain idle during a busy season because of engine trouble. Such idleness of the boat is avoided by providing for the rapid installation of a substitute engine or reverse gear.

The fire hazard is greatly minimized by forming the power bed in the nature of a pan or receptacle suitable for collecting the fuel or lubricating oil which may be spilled from the engine. Ordinarily, when fire breaks out, it spreads rapidly throughout the entire boat because the inflammable liquids are floated over a large area on the surface of the bilge water, and the large area of the flames makes it difficult to localize and extinguish the fire. In the present invention, however, the fire hazard is minimized because the power bed construction is in the form of a container which can be readily inspected and wiped out or drained of any combustible liquid. However, in the event of fire, the flames may be quickly and easily extinguished because the combustible liquids are all retained in the power bed.

Another advantage resulting from the pan formation of the power bed is that it protects the engine crank case and reverse gear housing from contact with the bilge water. This is of importance because contact of the bilge water with the crank case and the reverse gear housing causes corrosion which in time eats through the walls and damages the moving parts of the mechanism contained therein. The power bed is subject to such corrosion also but in the event that the corrosion eats through the wall thereof it may be patched or replaced with less expense than the crank case or gear housing. In the event that the power bed is eaten through no immediate danger results through leakage of oil or access of bilge water to the moving parts as would occur in the event the crank case or gear housing were eaten through.

A very important advantage resulting from the present invention is damping of the engine vibration. Although a cushion mounting for a boat engine is quickly recognized as desirable, the same presents a problem requiring acute consideration. This is due to the fact that the propeller shaft of a boat must necessarily be mounted with its axis in a fixed plane and it must be rigidly aligned with the reverse gear. Obviously it is detrimental to the packings and bearings of both the propeller shaft and the reverse gear to permit the engine or power plant to change its position in relation thereto. Accompanying this effect on machines and bearings is a power loss caused by the resultant dis-alignment between the engine and shaft which is a natural result of deflection in the cushioned engine mounting. Such a condition, which was heretofore unavoidable, is avoided in the present invention by providing a rigid support for the reverse gear housing, a cushioned support for the engine, and a double, rubber type universal or compensation joint between the engine and the reverse gear. The result of such a construction is that the vibratory motion set up by the operation of the engine is absorbed or dampened by the cushion support and the compensating universal joint so that the boat, the reverse gear and the propeller shaft do not receive an appreciable amount of the vibration, and further, this mounting arrangement permits the engine to be removed without disturbing the mounting, and therefore the alignment, of the reverse gear and the propeller shaft.

Numerous other advantages result from the individual mounting of the engine and the reverse gear in addition to the more important ones of simplifying service and the other advantages recited above. These other advantages will become apparent from an understanding of the invention as disclosed by way of example in the accompanying drawing in which—

Figure 1 is a plan of the power bed supporting an engine and reverse gear housing;

Fig. 2 is a side elevation, partly broken away and in cross section;

Figs. 3 and 4 are opposite end elevations, and

Fig. 5 is a cross section taken on the line 5—5 of Fig. 2.

In the drawing the numeral 1, designates the engine bed. The bed is shaped to receive an engine 2 so that any fuel or lubricating oil spilled from the engine is collected in the bed. For the purpose of mounting the engine bed in a boat it is provided with laterally extending flanges 3, shown by way of example, as being attached to keelsons 4 by bolts 5.

The engine bed 1 is primarily intended for a conversion unit, that is to say, for the purpose of adapting an automotive or industrial engine to marine use. The engine 2 illustrated represents a conventional V-type internal combustion engine provided at its front end with a pair of supporting brackets 6 which are attached to the flanges of the engine bed by securing elements 7. Between the brackets 6 and flanges 3 and between the flanges 3 and the heads of the securing elements 7 are mounted cushions 8, preferably of live rubber. The forward end of the engine 1 is thus supported on the bed 1 in a manner permitting it to float relative thereto.

The other end of the engine casing is formed with a flange 9 to which the clutch and transmission housings are attached when the engine is used in an automobile. However, the automobile clutch and transmission have no utility in marine use of the engine so they are entirely removed and brackets 10 are bolted as at 11 to the flange 9 from which they were removed. The brackets 10 are attached to the flanges 3 by securing elements 12 and cushions 13 are interposed between brackets and the flanges and between the flanges and the heads of the securing elements 12.

The brackets 6 and 10 support their respective ends of the engine relative to the bed and the cushions 8 and 13 permit the engine to float, to a slight degree, relative to the bed. The floating movement of the engine, even though limited, is sufficient to eliminate the transfer of vibration from the engine to the bed.

At the rear of the bed 1 is provided a housing 14 for supporting and enclosing a conventional reverse gear mechanism. The housing 14 has laterally extending flanges 15 which are rigidly secured to inwardly directed flanges 17 of the bed 1. Thus, direct and reverse propeller thrust is transmitted direct to the power bed and insulated from the engine. The drive shaft 18 of the reverse gear mechanism is connected at 19 to a propeller shaft 20. The forward end of the drive shaft 18 is connected to the flywheel 21 of the engine 2 through means of a double universal joint 22. The space between the forward end of the reverse gear housing 14 and the rearmost end of the engine is closed by a removable cover plate 23 having flanges 24 secured to the flanges 17.

The function of the device is thought to be apparent without further description. However, it is pointed out that the bed 1 is rigidly mounted relative to the boat and therefore provides for rigid mounting of the reverse gear housing in proper alignment with the propeller shaft 20. The vibration set up by operation of the engine 2 is absorbed in the cushions 8 and 13 and compensating universal joint 22 and floating movement of the engine, resulting from the use of the cushions, can take place without disturbing alignment of the housing 14 due to the use of the double universal connection 22. The engine 2 may be quickly and easily removed and its removal does not disturb the alignment of the reverse gear housing and the propeller shaft.

Although a specific embodiment of the invention has been illustrated and described it will be understood that various changes may be made within the scope of the appended claims without departing from the spirit of the invention, and such changes are contemplated.

What I claim is:—

1. In a boat having spaced apart keelsons, a power bed of dished form said power bed having lateral flanges at the sides thereof, resilient means attaching said opposite flanges to respective spaced apart keelsons with the dished portion of the bed depending between the keelsons and beneath the plane thereof, an engine, resilient means for attaching said engine to said flanges, said last named resilient means being disposed with respect to said engine whereby a substantial portion thereof resides within the dished portion of the bed while the remainder is exposed above the bed and supporting the engine out of actual contact with said bed, a propeller shaft, and means supported by said bed and connecting said propeller shaft with said engine.

2. In a boat having spaced apart keelsons, a power bed of dished form, said power bed having lateral flanges at the sides thereof, resilient means attaching said opposite flanges to respective spaced apart keelsons with the dished portion of the bed depending between the keelsons and beneath the plane thereof, an engine, resilient means for attaching said engine to said flanges, said last named resilient means being disposed with respect to said engine whereby a substantial portion thereof resides within the dished portion of the bed while the remainder is exposed above the bed and supporting the engine out of actual contact with said bed, a reverse gear mechanism rigidly mounted in said bed with a substantial portion thereof depending beneath the plane of said flanges, and a compensating connection between the engine and said reverse gear.

3. A conversion unit for mounting an automobile engine in a boat wherein the engine is of the type having means for attaching an automotive clutch thereto, said unit comprising a bed of dished form, said bed having lateral means, resilient means for mounting said lateral means on a pair of spaced apart supporting elements in the bilge of a boat whereby the dished portion extends downwardly between said supporting elements, resilient means attached to the means on said engine for attaching the clutch thereto and to the lateral means on said bed and supporting said engine out of contact with said bed and with a substantial portion thereof depending into the dished portion of the bed, and resilient means supporting the other end of said engine with respect to said bed.

4. A conversion unit for mounting an automobile engine in a boat wherein the engine is of the type having means for attaching an automotive clutch thereto said unit comprising a bed of dished form, said bed having lateral means, resilient means for mounting said lateral means on a pair of spaced apart supporting elements in the bilge of a boat whereby the dished portion extends downwardly between said supporting elements, resilient means attached to the means on said engine for attaching the clutch thereto and to the lateral means on said bed and supporting said engine out of contact with said bed and with a substantial portion thereof depending into the dished portion of the bed, resilient means supporting the other end of said engine with respect to said bed, a reverse gear mechanism rigidly mounted in said bed, and a compensating driving connection between the reverse gear and said engine.

FRANK O. FERNSTRUM.